United States Patent
Masten, Jr.

(10) Patent No.: US 10,543,435 B2
(45) Date of Patent: Jan. 28, 2020

(54) LOW-ENERGY DYNAMIC FILTER

(71) Applicant: James William Masten, Jr., Seattle, WA (US)

(72) Inventor: James William Masten, Jr., Seattle, WA (US)

(*) Notice: Subject to any disclaimer, the term of this patent is extended or adjusted under 35 U.S.C. 154(b) by 245 days.

(21) Appl. No.: 15/660,692

(22) Filed: Jul. 26, 2017

(65) Prior Publication Data

US 2019/0030462 A1   Jan. 31, 2019

(51) Int. Cl.
  *B01D 21/26*   (2006.01)
  *B01D 21/00*   (2006.01)
  *B01D 21/30*   (2006.01)

(52) U.S. Cl.
  CPC ....... *B01D 21/265* (2013.01); *B01D 21/0087* (2013.01); *B01D 21/30* (2013.01)

(58) Field of Classification Search
  None
  See application file for complete search history.

(56) References Cited

U.S. PATENT DOCUMENTS

| | | | |
|---|---|---|---|
| 2009/0050538 A1* | 2/2009 | Lean ............ | B01D 21/0087 209/155 |
| 2009/0283483 A1* | 11/2009 | Achard ......... | B01D 21/0012 210/802 |
| 2011/0096327 A1* | 4/2011 | Papautsky ..... | B01D 21/0087 356/335 |
| 2014/0093867 A1* | 4/2014 | Burke ........... | G01N 1/4077 435/5 |
| 2014/0367348 A1* | 12/2014 | Volkel .......... | B01D 21/265 210/787 |
| 2015/0268244 A1* | 9/2015 | Cho .............. | G01N 15/1429 435/7.23 |

* cited by examiner

*Primary Examiner* — Richard C Gurtowski

(57) ABSTRACT

A means to exploit the Dean Vortices for dynamic filtering on a macro scale intended for application in utility and industrial processes is disclosed. This method relies on an apparatus of computed construction to optimize the centripetal force and minimize the effect of gravity on the separation and effectiveness of the Dean Vortices. The method is also supported by an apparatus of construction which results in an optimized elliptical flow channel that enhances the formation and persistence of the Dean Vortices.

20 Claims, 5 Drawing Sheets

LOW-ENERGY DYNAMIC FILTER

FIELD OF THE INVENTION

The invention described herein offers significant improvements to the method and apparatus for the separation of fluid-suspended particulate contaminants from, and the purification of, industrial fluids such as wastewater, where the suspended particulate may range from a colloidal dispersion to suspended solids and certain dissolved solids.

BACKGROUND OF THE INVENTION

Significant field application developments in concert with abundant analytical research have created the basis for a novel conceptual method and a unique apparatus for separating heterogeneous material flows into separate higher and lower concentrate streams using Dean Vortices as extended to consider when elements in the flow and/or the fluid have gravitationally significant masses as a result of non-uniform density or dynamic viscosity, without sacrificing the capability to successfully separate out suspended or neutrally buoyant materials which exhibit uniform density and viscosity in dynamic flows.

Recently, significant research has been published presenting micro-fluidity technologies exploiting Dean Vortices and the mechanism utilizing the opposing forces of hydrodynamic flow and centripetal force as a means of condensing and separating non-homogeneous particles in a fluid. There is no doubt of the importance and the value of these emerging technologies for those applications where microchannel flow and cellular-sized particles are manipulated with these low-energy processes.

Typical of these implementations are Korean Patent 10-2016-0075568 and U.S. Pat. Nos. 8,807,879 B2 and 8,208,138 B2. These micro-channel implementations are characterized by rectangular flow channels and the linearly increasing radius of a circular spiral, where the plane of the spiral flow is orthogonal to the force of gravity, such that the orthogonal gravitational force applies collapsing pressure to the Dean Vortices across the short axis of the Dean forces.

But the interests of this disclosure target the application of low-energy particle separation from fluid carriers as applied to industrial and utility applications where typical fluid-suspended particle separation technologies involve large energy expenditures using various filter media, with significant maintenance and support requirements that limit "continuous" operations.

This novel variation of the Dean Vortices implementation has been realized in full size and implemented in an industrial application where the process was used to successfully classify and separate at a rate of more than 10 tons per hour.

BRIEF SUMMARY OF THE INVENTION

The Low-Energy Dynamic Filter is a typical Dean Vortices implementation with the enhancement of the additional consideration of the gravitational effects on the fluid and the suspended particles. By constructing the major axis of the spiral implementation around which the Dean Vortices flow to be parallel to the gravity vector, the preferred embodiment nearly eliminates the effect of gravity on the suspended particles at significant points in the fluid channel.

Most significant is the elimination of the distortion of the Dean Flow when the apparent flow characteristics of density and/or viscosity are not uniform because of the dynamic effects of the fluid system on the suspended particles, such that the orthogonal Dean Flow is significantly influenced by the forces of gravity.

Of minor consideration is the novel apparatus which affordably creates a high performance boundary layer and a more optimized flow channel for the propagation of Dean Vortices by mechanically altering the cross-sectional shape of a compliant tube. The force application could be static or applied dynamically which, along with a variable flow rate, could be used to optimize the application of hydrodynamic forces and centripetal forces to selectively collect suspended or neutrally buoyant particles in the fluid.

View 1D: Illustrates the novel elliptical flow channel with the gravitational forces orthogonal to the Dean Flow tending to collapse the separation of the two competing Dean Flow forces.

Figure 2:
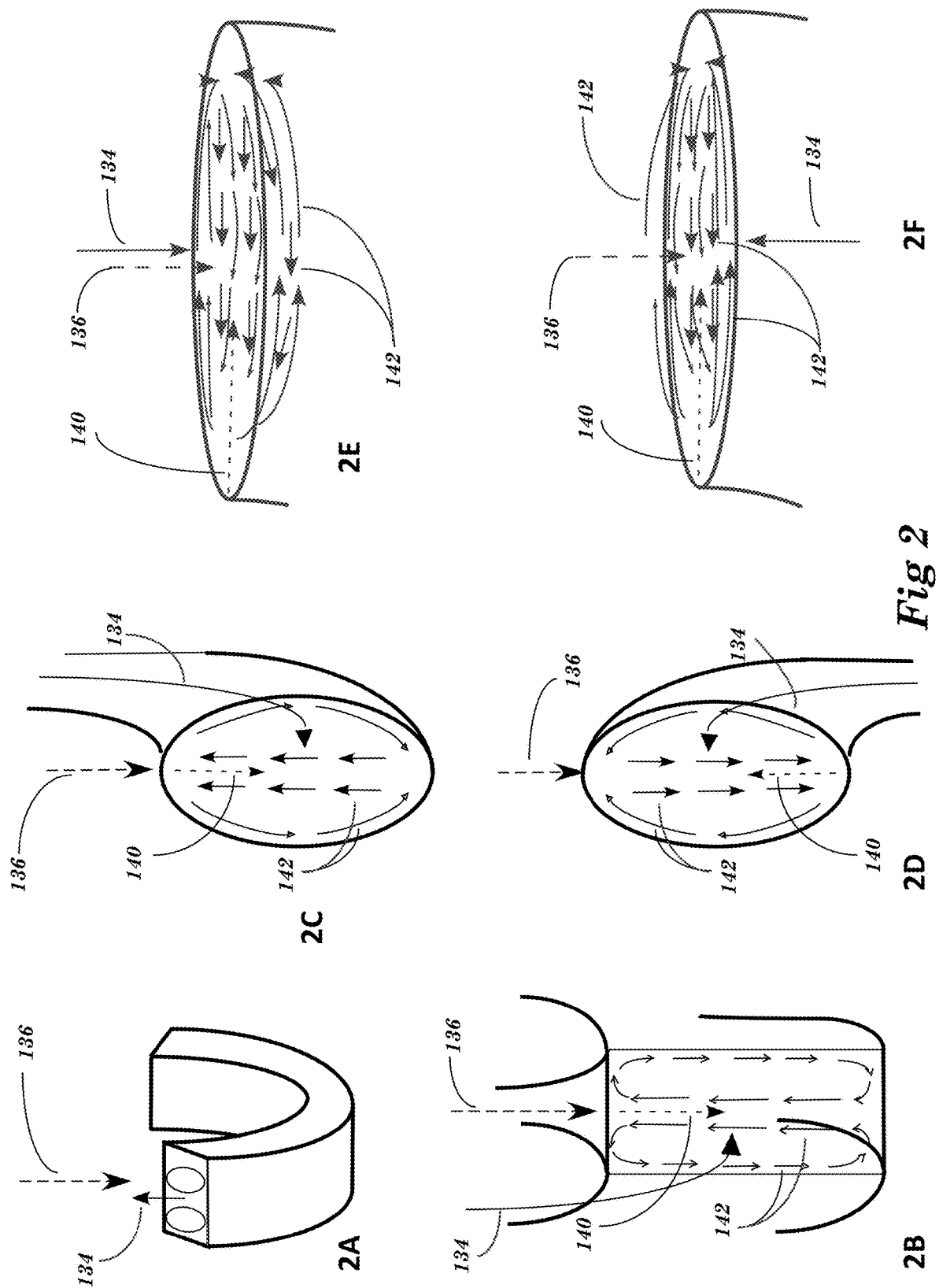

FIG. 2. Illustrates gravitational forces on rectangular (View 2A) and elliptical (Views 2E, 2F) channels with major flow axis oriented parallel or "in plane" with gravity; while gravitational forces shown orthogonal to flow in both rectangular and oval shaped flow (Views 2B, 2C and 2D) illustrate forces relationships avoiding the collapse of the cross-flow Deans Vortices.

Figure 3:
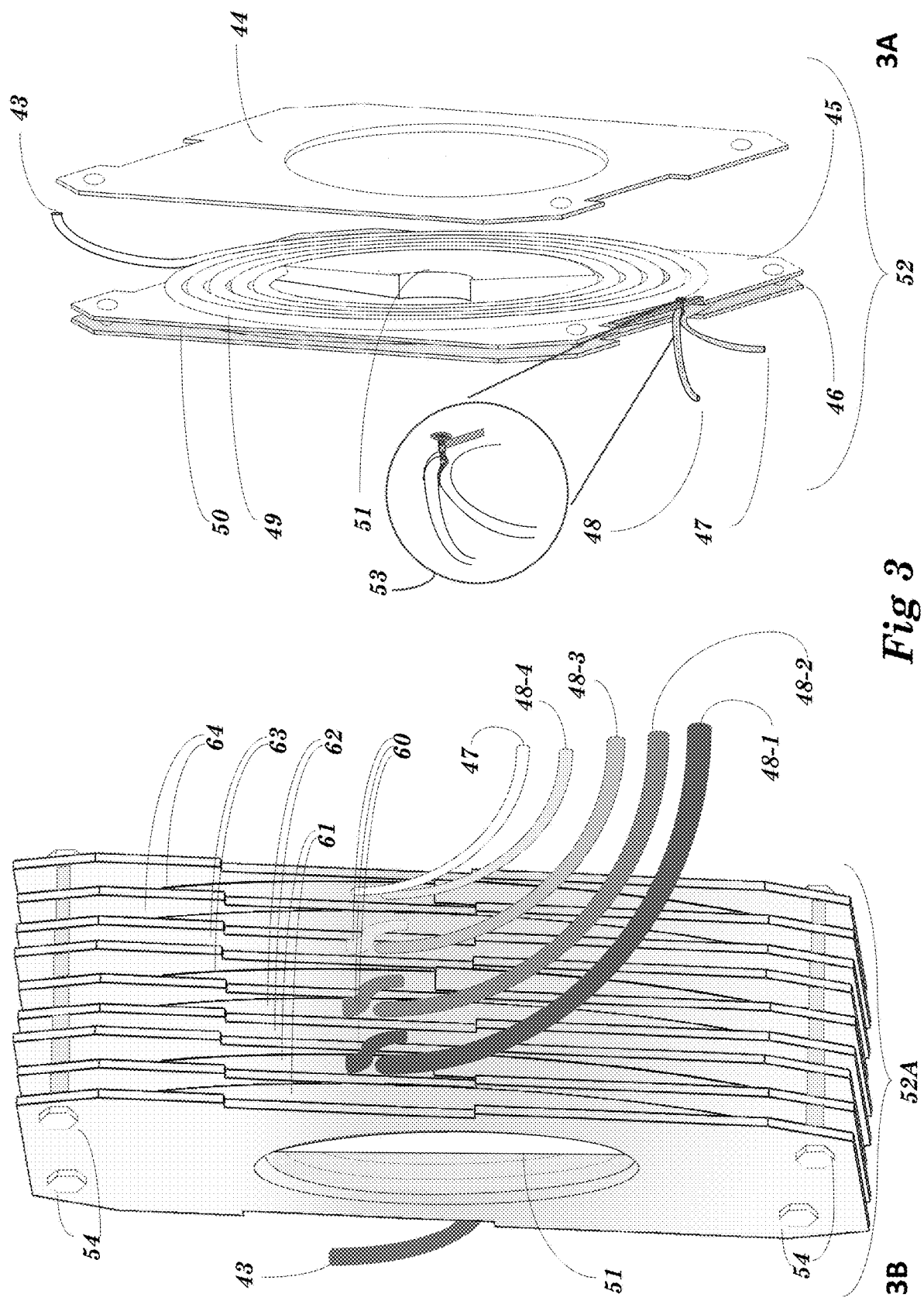

FIG. 3. Illustrates the physical configuration of the variable-radius toroidal stack of the Low-Energy Dynamic Filter, showing in View 3A a single stack and in View 3B a configuration of 9 plates, making a four-layer stack where each single stack shares an end plate with the neighboring stack.

Figure 4:
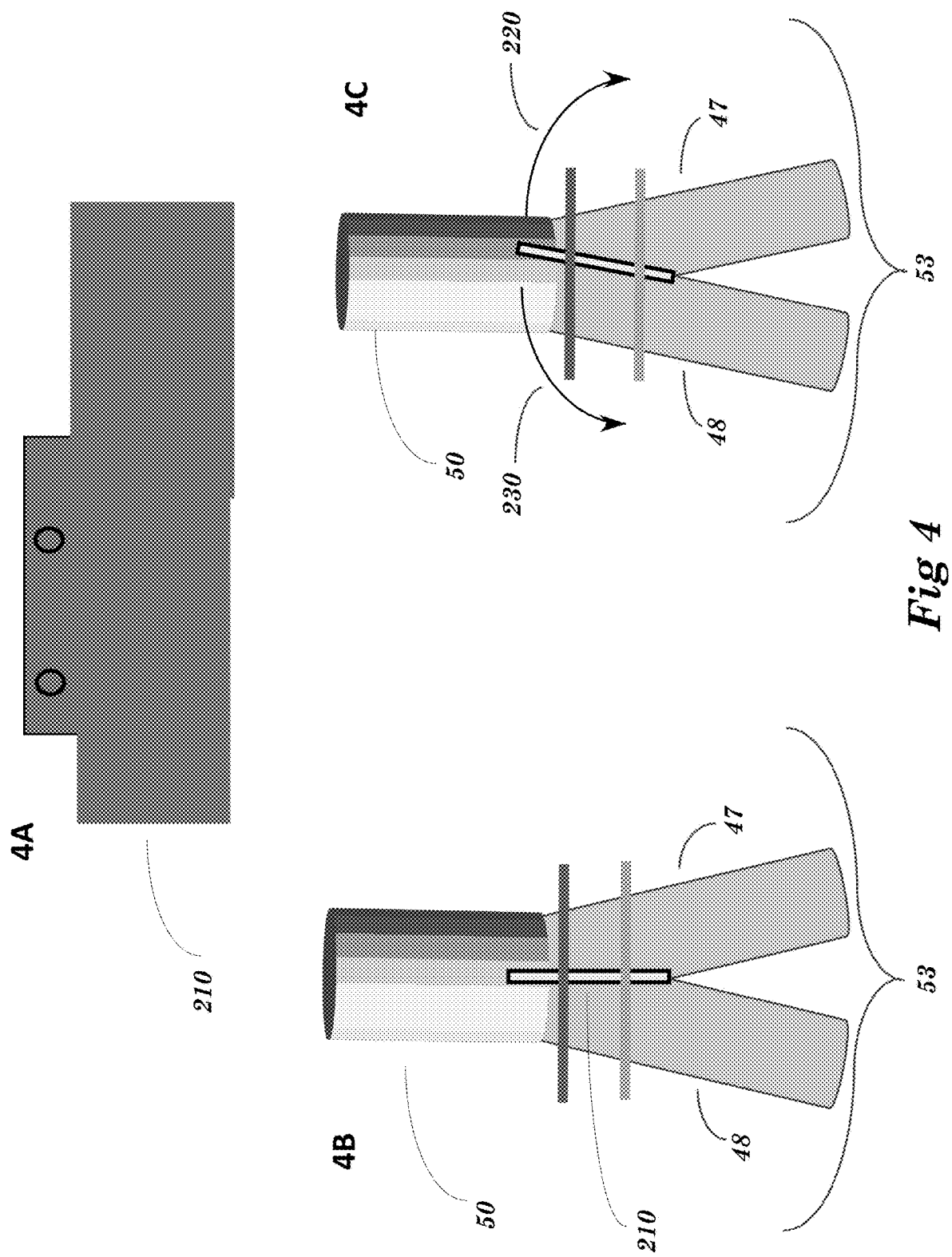

FIG. 4. Illustrates the adjustable separation trimming edge of the Low-Energy Dynamic Filter. View 4A shows the trimming edge plane view; View 4B shows the trimming edge in position where the flow is directed equally between the product and waste collection channels; View 4C shows the trimming edge in position to divert most of the flow to the waste collection channel.

Figure 5:
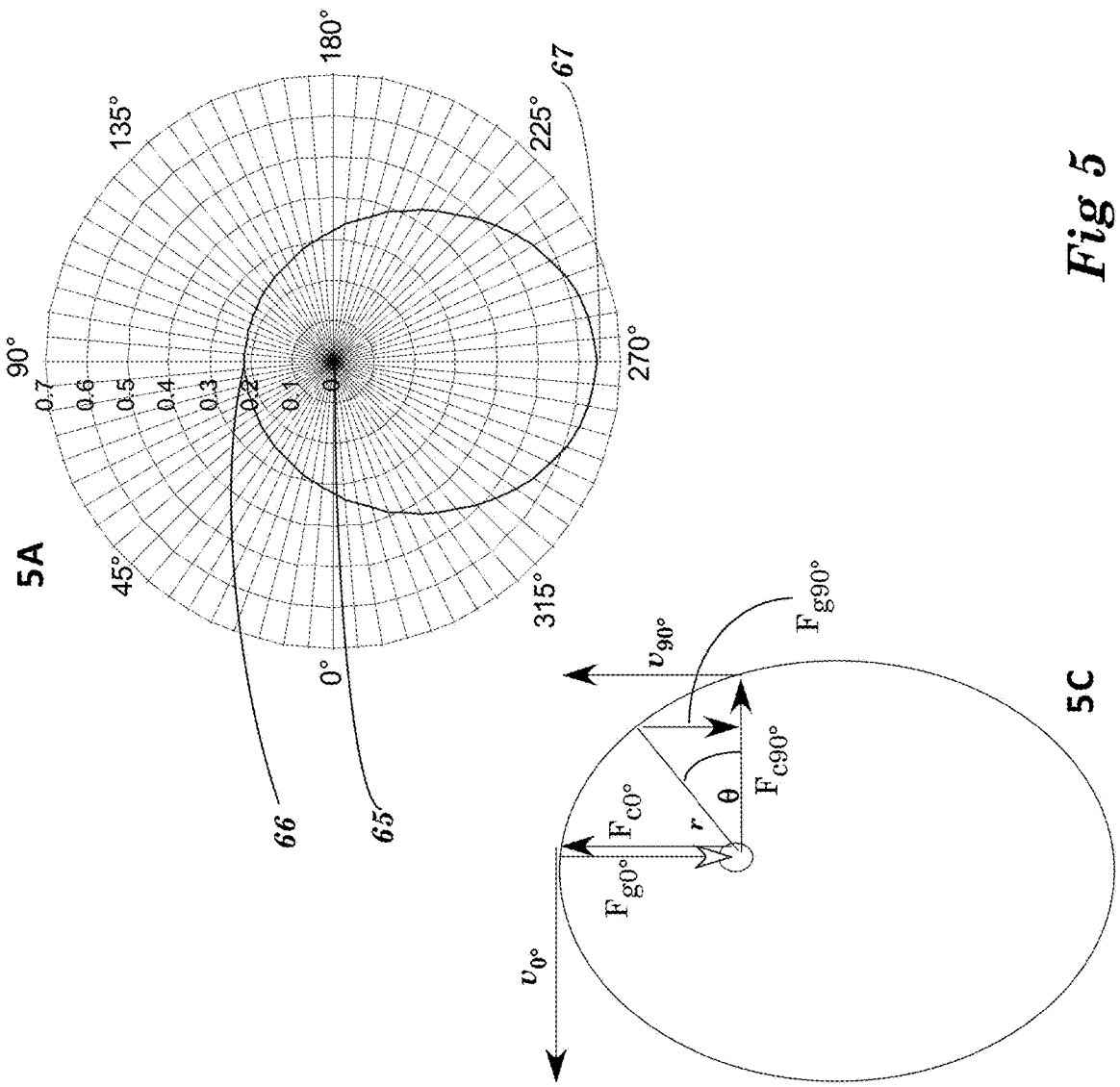

FIG. 5. View 5A is a polar plot representation of the results for the variable radius calculation in which the value for acceleration (a) is set to 2 g's (standard gravitational units) and a constant velocity of 2.5 m/s. The polar plot shows data at intervals of 5 angular degrees and describes a plot forming a Cartesian Oval. View 5B is the actual data used for the plot, shown in meters, and annotated to indicate the values at 0°, 85°, 90°, 180°, 265°, and 270°. View 5C shows an example Cartesian Oval with force and velocity vectors shown at θ=0° and at θ=90° for illustrative purposes.

The equations used to calculate the values for the radii r and to derive the vectors are as follows (equations are numbered here for reference later):

($e_1$) $F_g = F_G \times \sin(\theta)$ where $F_G$ is the standard gravitational force in mks units and θ is the angle between r and the centripetal force $F_C$, as shown in 5C ($e_2$) Total Force = $F_C = (\sin(\theta) \times F_G)$ ($e_3$) Force = $ma$ where m is mass and a is acceleration ($e_4$) Total $a = (v^2/r) - (\sin(\theta) \times F_G)$ where v is the axial velocity for a specific r at angle θ

($e_5$) $r = v^2/((\text{Total } a) + (\sin(\theta) \times F_G))$

Using the specific values stated above (a=2 g, v=2.5 m/s, and $F_G$=9.8 m/s$^2$)

($e_6$) $r = (2.5)^2/((2 \times 9.8) + (\sin(\theta) \times 9.8))$

Using values of θ at 5 degree intervals yields the r values in the table of View 5B, and the polar plot of View 5A.

| Reference Marking | Description |
|---|---|
| r | Represents the radius of curvature of the channel. |
| θ | The angle of rotation around the toroidal flow (angle θ) |
| $F_{g0°}$ | Gravity Force vector ($F_g$) when the radius r is chosen at angle θ = 0° |
| $F_{g90°}$ | Gravity Force vector ($F_g$) when the radius r is chosen at angle θ = 90° |
| $F_{C0°}$ | Centripetal Force Vector ($F_c$) when the radius r is chosen at angle θ = 0° |
| $F_{C90°}$ | Centripetal Force Vector ($F_c$) when the radius r is chosen at angle θ = 90° |
| $v_{0°}$ | Represents the axial velocity (v) when the radius r is chosen at angle θ = 0° |
| $v_{90°}$ | Represents the axial velocity (v) when the radius r is chosen at angle θ = 90° |
| 43 | Input channel. |
| 44 | Stack leaf compression plate cover, top. |
| 45 | Stack leaf support plate with integral cross over. |
| 46 | Stack leaf compression plate cover, bottom. |
| 47 | Outlet channel, filtered. |
| 48 | Outlet channel, contaminant stream, for single stack 52. |
| 48-1 | Largest diameter channel stack contaminant output stream in a four-layer stack 52A. |
| 48-2 | First reduced diameter channel stack contaminant output stream in a 4-layer stack 52A. |
| 48-3 | Second reduced diameter channel stack contaminant output stream in a 4-layer stack 52A. |
| 49-4 | Third reduced diameter channel stack contaminant output stream in a 4-layer stack 52A. |
| 49 | Flow channels, side one. |
| 50 | Flow channels, side two. |
| 51 | Integrated crossover flow channel between side one and side two. |
| 52 | A single stack, "layer," including flow channels one and two, support plate with crossover, top plate and a bottom plate. |
| 52A | A four-layer stack, where each single stack shares an end plate with the neighboring stack. |
| 53 | Callout showing stack input channel, illustrating the movable selection edge. |
| 54 | Compression bolts. |
| 60 | Inner stack crossover fittings |
| 61 | Largest diameter channels side one and side two. |
| 62 | First reduced diameter channels side one and side two. |
| 63 | Second reduced diameter channels side one and side two. |
| 64 | Smallest diameter channels side one and side two. |
| 65 | The geometric center of the rotational toroid. |
| 66 | The minimum radius point of the computational distribution of the variable radius. |
| 67 | The maximum radius point of the computational distribution of the variable radius. |
| 112 | The flow velocity distribution into a straight tube. |
| 114 | Straight tube section. |
| 116 | The Reynolds or "eddy" effects of flow distribution from the drag of the boundary layer against the tubing walls to the center flow of a straight circular tube. |
| 122 | Flow velocity distribution of a curved tube |
| 124 | A curved tube showing internal flow distribution. |
| 126 | The Reynolds or "eddy" effects of flow distribution from the drag of the boundary layer against the tubing walls to the center flow of a curved circular tube. |
| 131 | The distorted flow in a rectangular cross-section channel with insufficient velocity v to form Dean Vortices. |
| 132 | Illustrates the Dean Vortices formed inside the rectangular curved channel with sufficient velocity v. |
| 134 | The major fluid flow vector. |
| 136 | Gravity force vector ($F_G$). |
| 140 | Centripetal Force vector within the flow chamber ($F_c$). |
| 142 | Hydrodynamic Force vectors. |
| 210 | The diverter edge that can be adjusted to separate the flow across the flow channel 50 from inside edge to outside edge. |
| 220 | Indicates advancing the edge of diverter 210 to the outside wall moving more of the cross sectional flow to the inside or waste collection channel. |
| 230 | Indicates advancing the edge of diverter 210 to the inside wall moving more of the cross sectional flow to the outside or product collection channel. |

DETAILED DESCRIPTION OF THE INVENTION

Figure 1:
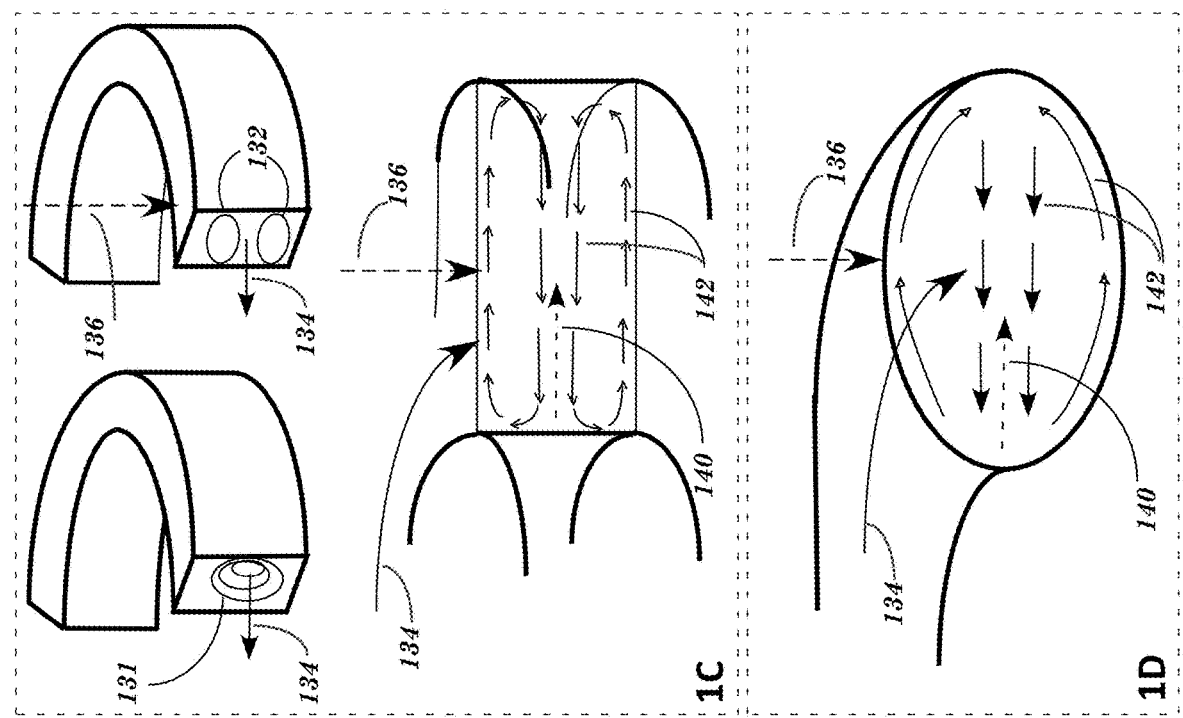
FIG. 1. View 1A: Illustrates the relative-flow velocity distributions of (current state of the practice) example round straight flow View 1B: Illustrates the relative flow velocity distributions of (current state of the practice) round curved flow channels View 1C: Illustrates 3 views of rectangular curved flow channel with the gravitational forces orthogonal to the Dean Flow. The top left illustration shows the single flow when velocity is insufficient to create Dean Vortices; the top right illustration shows the flow changed to Dean Vortices as the velocity increases; the bottom illustration shows the apparent centripetal force, the hydrodynamic force, the flow and the gravitational force vectors inside the curved rectangular channel of the top right illustration.
Figure 1:
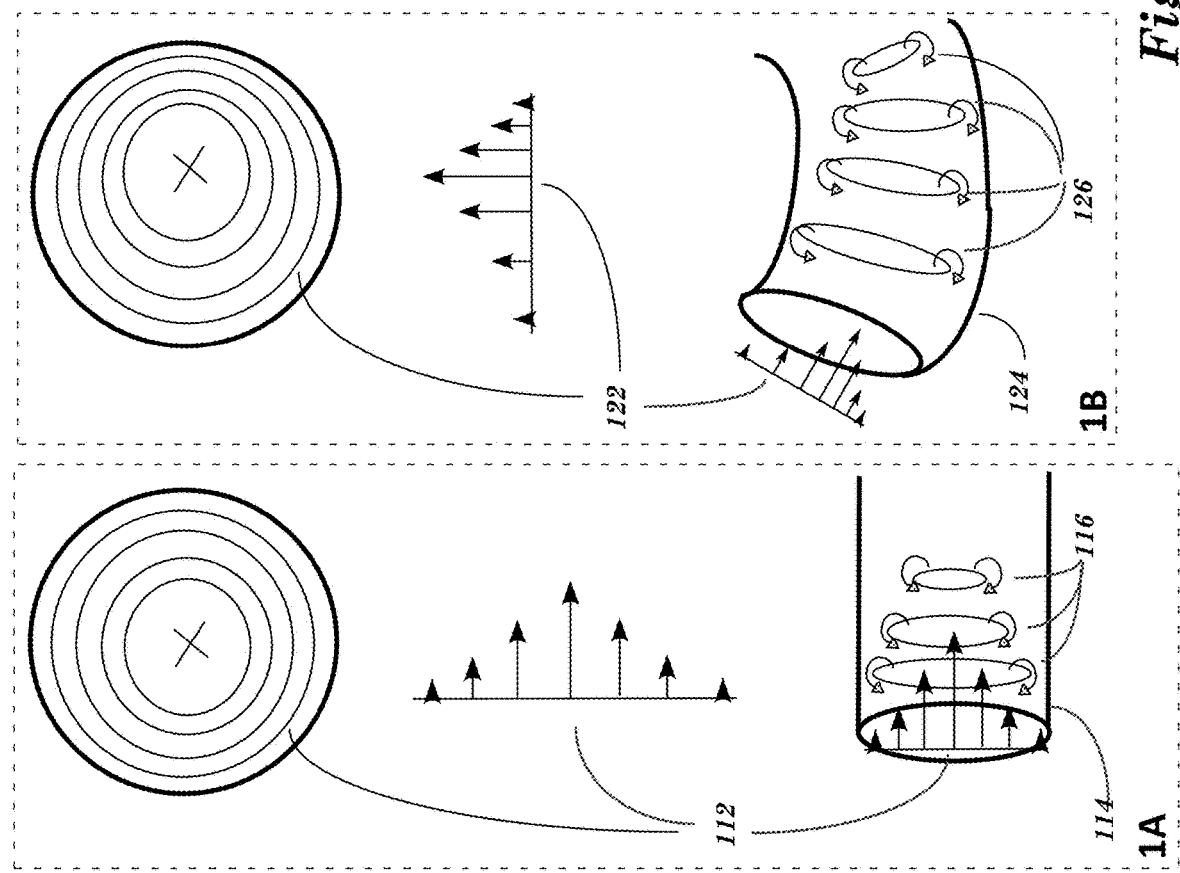

The invention detailed herein addresses two issues seen in current state-of-the-practice apparatus through evolution and adaptation of the Dean Flow analysis used to supplement the well-known Reynolds analysis of flow as applied to toroidal systems, composed of relatively small diameter flow channels d. The Dean Flow analysis relating the Dean Number, the diameter of the flow channel and the radius of curvature of the flow channel, when (d«r) as applied here, is stated as follows:

$$D_e = \frac{\text{(Centripetal forces)(inertial forces)}}{\text{Viscous forces}} =$$

$$= \frac{\sqrt{\left(\rho \frac{r}{d} \frac{v^2}{(r/d)^2}\right)(\rho v^2)}}{\mu(v/d)}$$

$$= \sqrt{\frac{d}{2r}} \frac{\rho v d}{\mu}$$

$$= R_e \sqrt{\frac{d}{2r}}$$

Where $D_e$ is the Dean's number
$\rho$ is the density of the fluid
$\mu$ is the dynamic viscosity
v is the axial velocity
d is the diameter of the flow channel
r is the radius of curvature of the channel
$R_e$ is the Reynold's number As shown in FIGS. 1 and 2, current state of the practice creates apparatuses that do not address issues of the dynamic flow of a fluidic system where the suspended and/or neutrally buoyant particles and the fluid under the influence of gravity can no longer be considered to have uniform viscosity and density and thus enable the gravitational distortion and collapse of the Dean Vortices. The first issue is that these apparatus present the Dean Vortices in a plane orthogonal to the gravitational forces, allowing for the deformation of the Dean Vortices and leading to their collapse. The second issue is that the shape of the channels used in these apparatuses allows distortion in the corners. FIG. 1 View 1A (top) shows a cross sectional view of a straight section of a circular flow channel and the distribution of velocity vector rings 112 that illustrate typical slow boundary layer flow against the walls of the flow channel as depicted by the velocity vector distribution 112 for a straight conduit; 116 is an illustration of the circular rolling eddy currents created in a segment 114 by the distribution of velocity as illustrated by vectors 112 caused by flow adhesion at the boundary layer near the walls of the conduit.

In a curved section 124 of a flow channel, the compressed velocity vectors rings 122 and the compressed and non-uniform distribution of the velocity vectors 122 are the result of centripetal forces in the curved conduit. The rolling eddy currents 126 bending in their flow are the result of the centripetal forces introduced by the acceleration of the curve in the conduit while still exhibiting the flow rate distribution 122 as a result of boundary layer adhesion. But the round conduit does not allow sufficient laminar flow velocity v to support stabilized Dean Vortices.

The evolution of a curved rectangular cross-section distorted flow 131 to stabilized rectangular cross-section distortion 132 is predicted by the Dean Number, $D_e$, when the Dean Number, as characterized by the ratio of the diameter of the conduit d to the radius of curvature of the circular or spiral path r, is much smaller than unity and there is sufficient flow velocity v. A rectangular flow channel with a significant variance between the lengths of the long and short sides enhances the onset of the Dean Vortices and aids in their persistence over a larger range of velocities.

The formation of Dean's Vortices orthogonal to the flow 134 is the result of the contrasting effects of centripetal force 140 and hydrodynamic forces 142. In the current practice, this phenomenon has been exploited to create micro-channel membraneless filtering to isolate and collect suspended or neutrally buoyant particles where the hydrodynamic forces are balanced by the centripetal forces of the relative density and hydrodynamic drag, or resistance, for particular particles. Of important note is that in the current practice, as shown in view 1C in FIG. 1, the gravitational force ($F_g$) is orthogonal to the major flow vector 134 and orthogonal to the centripetal forces ($F_c$) 140 vectors and the hydrodynamic force vectors 142. Thus the gravitational force is compressing the short radius of the Dean Vortices. But the current practice micro-channel implementations of membraneless filtering rely on the uniform viscosity and density of the fluid system, including the suspended or neutrally buoyant particles and the fluid to limit the effects of gravity on the propagating Dean Vortices.

Gravitational forces in this orientation 1C are not countered by the flow vector 134 or the centripetal force 140. As such, the centripetal force and the hydrodynamic force of the two counter-rotating Dean Vortices are subject to compression of the system of fluid and suspended or neutrally buoyant particles, if that composite system of fluid and particles does not move with the fluidity of a homogeneous fluid. This is the normal orientation of similar apparatuses found in the field of both research and application today and as such there are no co-aligned forces that can be manipulated to counter the disrupting effects of gravity acting with significant leverage against the modest forces of centripetal acceleration and hydrodynamic flow.

It is this inventor's contention that gravitational effects have prevented the large scale adoption of dynamic filtering for utility and industrial applications. The unique method detailed herein benefits from real world empirical analysis of trial and error along with analytical support in the areas that are usually taken as assumptions in both Reynolds $R_e$ and Dean $D_e$ analytical expressions. The method described herein rotates the major spiral or circular flow 134 to operate in the gravitational plane.

These typical working assumptions are that the fluidic density $\rho$ and the fluid viscosity $\mu$ are both constant throughout the flow. Such assumptions limit the adaptation of the Dean Flow in application to particle separation to a limited class of suspended or neutrally buoyant particles that are not affected by the force of gravity in a dynamic flow when captured by the competing centripetal and hydrodynamic forces of the Dean Vortices.

The method present herein specifically extends the previous method of application of the Dean Vortices to the simultaneous application of fluids with suspended or neutrally buoyant particles that are affected by the force of gravity in a dynamic flow when captured between the centripetal and hydrodynamic forces without sacrificing the effectiveness of segregating those particles that are not affected by gravity in a dynamic flow by rotating the circular or spiral axis to be in the same plane as the gravitational vector 136.

The technique of this method is the control of the forces of implementation of the Dean Vortices to counter the effects of gravity. The effects available to control are the result of the centripetal force and the fluid velocity v, which in the case of incompressible fluids could be manipulated directly or indirectly by building flow channels of variable cross-sectional area; thus with constant fluid flow volumes it is possible to directly control fluid velocity.

Alternatively, the effects of velocity could be manipulated by controlling the centripetal acceleration, which can be realized as the angular rate, which for a constant velocity of flow is actually just a function modifying the radius of the circular or spiral path r to create a toroidal path.

Foundational to this method is the re-orientation of the toroidal flow channel (all views in FIG. 2) to be in the vertical gravitational plane aligned with the gravity force vector such that the force of gravity is aligned with the centripetal force vector 140. Additionally, because the Dean Vortices are orthogonal to the major flow 134 as the major flow moves around the toroid, the major flow vector 134 will align with the gravitational force vector 136. Thus, the gravitational force vector is minimally disruptive because it is orthogonal to the counter-flow paths of the two counter-rotating Dean Vortices 2E, 2F.

In these instances when the principal toroidal flow 134 is vertical either up 2F or down 2E (angle θ is either zero or 180 degrees) and operating either against 2F or with 2E gravity, the principal flow and the force of gravity combine to push the forces of the Dean Vortices either up 2F with the principal flow against gravity or down 2E with the force of gravity. In either direction the forces of the Dean Vortices are not forced towards collapse. Although the vortices may be pushed to elongate their long axis and bow up or down, they are not pushed to collapse their short axis or the separation between the two counter-rotating vortices.

At every other point along the toroidal flow path where the sine of θ is not zero, this method computes the radius r of the toroidal flow channels as a function of the angle θ between the radius and the plane normal to the gravitational plane while the flow velocity remains constant.

The equation for Total Force ($e_2$) forms the basis of this method. The centripetal force can be varied such that the gravitational force component that is orthogonal to the long axis or working axis of the hydrodynamic 142 and centripetal forces 140 that drive the Dean Vortices with the result of particle separation can be countered at all angles except zero and 180 degrees when the sine of θ is zero. In this example, for a given velocity (2.5 m/sec) and total centripetal force (2 g's) a table 5B of radii r can be computed where the vertical component of gravity acting to influence the centripetal force can be countered in the plane of interest by calculating radius r by equation ($e_5$) as executed using specific values ($e_6$).

While at the horizontal extremes (θ is zero or 180 degrees) where the centripetal forces 140 cannot be used to counter the force of gravity 136, the forces of gravity are operating directly against or with the force of the major toroidal flow 134. If the fluid is not compressible, nor the flow channel significantly deformable, then the flow velocity v will remain nearly independent of the gravitational force pushing or pulling the flow velocity vector and thus have a minimal effect on the elongation of the Dean Vortices cross-flow characteristics.

FIG. 5 includes a table (View 5B) of r values, expressed in meters, computed for a velocity of 2.5 m/sec and a continuous net centripetal force of 2 g's. As shown in the radial plot (View 5A), the center of the rotation of the toroid 65 is offset and supports radii from the minimum 66 to the maximum 67 as shown on the radial graph illustrating radii from a minimum of about 0.21258 meters to a maximum of about 0.6377 meters creating a graphical shape known as a Cartesian Oval (66, 67).

The other issue addressed by this disclosure is the shape of the flow channel. Whereas the state of the practice employs rectangular channels to enable the onset of the Dean Vortices, this disclosure improves upon the rectangular cross-section channel and the inherit discontinuities presented by the corners of the channel to smooth flow through the implementation of elliptical-shaped flow channels. Elliptical-shaped flow channels with significant variance between the long and short diameters enable the formation of Dean Vortices over a much broader range of flow velocities than the rectangular cross-section channel.

The preferred embodiment of this method is presented in FIG. 3 in the unique apparatus 52 of stacked plates 44, 45 and 46 and deformable tubing 43, 47, 48, 49. The deformable tubing in this implementation supports an enhancement that aids the formation of Dean Vortices by creating a non-circular flow channel 1D, 2C, 2D, 2E, 2F. This technique avoids the turbulence-inducing right-angle corners of a rectangular flow channel. Instead, this apparatus features a compression-limiting crossover duct fixture 51 that serves to limit the compression of the round deformable flow channel to become an elliptical flow channel 1D, 2C, 2D, 2E, 2F with a significant variance between the long and short diameters. This configuration enhances the onset of the Dean Vortices and aids in their persistence over a larger range of velocities.

A significant aspect of the apparatus is the optimization of the toroidal loops with nearly ideal radial dimensions 49, 50 by stacking them in the horizontal dimension between the compression plates 44, 45, 46 and making use of the compression-limiting crossover duct 51 to seamlessly route the flow 49 to another toroidal construct 50 with identical radial dimensions.

Also, apparatus 53 is implemented as a tunable feature of the dynamic filter employing a movable edge 210 to select particle collections for inclusion or exclusion that may be distributed along the zero net force path between the opposing Dean Forces 140, 142 of the centripetal force pushing the mass of the particles to the outside and the hydrodynamic force pushing the hydrodynamic resistance to the inside. The mass of the particle is pushed to the outside by the centripetal force while the resistance to hydrodynamic flow causes the suspended particles to be pushed to the inside of the channel. A particle's susceptibility to centripetal vs. hydrodynamic flow is related to the particle's density and physical construct as well as the principal flow velocity. The zero net force point is the position between the outer wall and the inner wall where a particular particle's mass is pushed outward by centripetal force to exactly match the inward hydrodynamic pressure from the counter hydrodynamic flow.

Adjusting the tunable edge incrementally towards the outside 220 or the inside 230 of the output flow channel and variation of the principal flow velocity enable this apparatus to sort or separate an extended range of mass vs hydrodynamic drag particles.

The assembled apparatus 52A can consist of any number of stacks 52. As an example, 52A presents an assembly of 9 plates capturing 4 pairs of spiral channels 61, 62, 63, and 64, each pair configured to optimum radius r for a particular channel diameter d.

Bolts 54 are used to compress the flow channels to an optimum elliptical shape 1D, 2C, 2D, 2E, 2F. Typical input fluid channels 43 feed at desired fluid flow velocity v. The dynamic filter of each stack 61, 62, 63 or 64 of selected diameter and fluid flow velocity will separate suspended particles to discharge through fluid channels 48-1, 48-2, 48-3 and 48-4 with the remaining flow channel 47 free of an extended range of suspended particles separated by this configuration.

Crossover compression-limiting device 51 serves to connect the two toroidal flows of each stack 52 and the stack cross-connecting flow channels 60 serve to provide connections between the co-mounted stacks 52 into structure 52A.

What is claimed is:

1. A method for separating first and second particles in a fluid, the method comprising:
   introducing a plurality of non-homogenous particles in a fluid media into a flow circuit that is oriented to flow in a plane parallel to the force of gravity;
   flowing the particles through at least one loop in a channel of the flow circuit at a velocity that causes Dean vortices to form in the at least one loop, wherein the Dean vortices are present along an entire extent of the at least one loop; and
   separating the particles according to at least one of a hydrodynamic drag property and a mass property by diverting the first particles into a first flow path from the second particles into a second flow path after passing through the at least one loop.

2. The method of claim 1, wherein the channel has an elliptical shape.

3. The method of claim 1, wherein the channel comprises a deformable tube.

4. The method of claim 3, wherein the deformable tube is wound around a compression-limiting element, the method further comprising:
   compressing the deformable tube to change its shape.

5. The method of claim 4, wherein compressing the deformable tube comprises compressing the tube until Dean vortices are formed along the entire extent of the at least one loop.

6. The method of claim 4, wherein the deformable tube is selectively compressed to change its cross-sectional area according to effects of the force of gravity along the at least one loop.

7. The method of claim 6, wherein compressing the deformable tube includes compressing the deformable tube so that a section of the deformable tube that facilitates flow in the direction of gravity has a larger cross-sectional area than a section of the deformable tube that facilitates flow against the direction of gravity.

8. The method of claim 1, wherein the at least one loops is non-circular.

9. The method of claim 8, wherein a radius of the at least one loop varies so that centripetal forces within the channel vary according to the orientation of the channel with respect to gravity.

10. The method of claim 9, wherein a section of the at least one loop that facilitates flow in the direction of gravity has a greater radius than a section of the at least one loop that facilitates flow against the direction of gravity.

11. The method of claim 1, further comprising:
    setting a flow diverter disposed at an end of the circuit at a zero net force position in order to divide the two separate flow paths.

12. An apparatus for separating particles in a fluid media, the apparatus comprising:
    a flow circuit configured to flow the fluid media through a channel comprising at least one loop arranged in a plane parallel to the force of gravity in order to counter the force of gravity by varying at least one of a shape of the channel and a radius of the at least one loop; and
    a diverter disposed at an end of the flow circuit and configured to divert the fluid media into two separate flow paths,
    wherein the flow circuit is configured to maintain Dean vortices along an entire extent of the at least one loops.

13. The apparatus of claim 12, wherein the channel comprises a deformable tube.

14. The apparatus of claim 12, wherein the channel has an elliptical shape.

15. The apparatus of claim 12, wherein the at least one loop is non-circular.

16. The apparatus of claim 12, wherein a radius of the at least one loop varies so that centripetal forces within the channel vary according to the orientation of the channel with respect to gravity.

17. The apparatus of claim 12, wherein the diverter is an adjustable diverter comprising a movable leading edge that can be moved to adjust the two separate flow paths.

18. The apparatus of claim 12, wherein the at least one loop is a plurality of loops consecutively arranged in the plane parallel to the force of gravity.

19. The apparatus of claim 18, wherein the loops are arranged in a helix.

20. The apparatus of claim 19, wherein each of the loops has the same shape.

* * * * *